(12) United States Patent
Ikeda (10) Patent No.: US 9,118,085 B2
(45) Date of Patent: Aug. 25, 2015

(54) LITHIUM SECONDARY BATTERY AND USE OF SAME

(75) Inventor: Hiroaki Ikeda, Toyota (JP)

(73) Assignee: Toyota Jidosha Kabushiki Kaisha, Toyota-shi Aichi (JP)

( * ) Notice: Subject to any disclaimer, the term of this patent is extended or adjusted under 35 U.S.C. 154(b) by 331 days.

(21) Appl. No.: 13/126,175

(22) PCT Filed: Nov. 6, 2009

(86) PCT No.: PCT/JP2009/068997
§ 371 (c)(1),
(2), (4) Date: Apr. 27, 2011

(87) PCT Pub. No.: WO2010/053157
PCT Pub. Date: May 14, 2010

(65) Prior Publication Data
US 2011/0206977 A1 Aug. 25, 2011

(30) Foreign Application Priority Data
Nov. 6, 2008 (JP) ................. 2008-285835

(51) Int. Cl.
*H01M 10/0587* (2010.01)
*H01M 10/052* (2010.01)
*H01M 2/02* (2006.01)
*H01M 4/13* (2010.01)
*H01M 4/36* (2006.01)
(Continued)

(52) U.S. Cl.
CPC .......... *H01M 10/052* (2013.01); *H01M 2/0257* (2013.01); *H01M 2/0285* (2013.01); *H01M 4/13* (2013.01); *H01M 4/366* (2013.01); *H01M 4/62* (2013.01); *H01M 4/661* (2013.01); *H01M 10/02* (2013.01); *H01M 10/0481* (2013.01);
(Continued)

(58) Field of Classification Search
USPC ......................................... 429/156, 172, 251
See application file for complete search history.

(56) References Cited

U.S. PATENT DOCUMENTS

2004/0021442 A1* 2/2004 Higashino ..................... 320/112
2004/0101763 A1* 5/2004 Kotato et al. ................. 429/331
(Continued)

FOREIGN PATENT DOCUMENTS

| JP | 7-220759 | 8/1995 |
|---|---|---|
| JP | 2005-174792 | 6/2005 |

(Continued)

OTHER PUBLICATIONS

International Search Report in International Application No. PCT/JP2009/068997; Mailing Date: Dec. 28, 2009.

*Primary Examiner* — Patrick Ryan
*Assistant Examiner* — Lucas J O'Donnell
(74) *Attorney, Agent, or Firm* — Finnegan, Henderson, Farabow, Garrett & Dunner, LLP (57) ABSTRACT

A lithium secondary battery provided by the present invention includes an electrode body (80) having a structure in which a positive electrode (10) and a negative electrode (20) are laminated, with a separator (30) interposed therebetween, and a porous insulating layer (40) obtained by filling and molding insulating particles is formed on the surface of at least one of the positive electrode (10) and the negative electrode (20) on the side facing the separator (30), wherein insulating particles having a tap density of 0.4 g/cm$^3$ to 0.9 g/cm$^3$ are used as the insulating particles that compose the porous insulating layer (40), and moreover a pressure (90) that is applied in the direction of the lamination to the electrode body (80) is set to a range of 4 kgf/cm$^2$ to 50 kgf/cm$^2$.

9 Claims, 7 Drawing Sheets (51) Int. Cl.
*H01M 4/62* (2006.01)
*H01M 4/66* (2006.01)
*H01M 10/02* (2006.01)
*H01M 10/04* (2006.01)

(52) U.S. Cl.
CPC .......... *H01M10/0587* (2013.01); *Y02E 60/122* (2013.01); *Y02T 10/7011* (2013.01)

(56) References Cited

U.S. PATENT DOCUMENTS

2006/0127769 A1\* 6/2006 Fujimoto et al. ........... 429/231.1
2006/0188785 A1\* 8/2006 Inoue et al. .................... 429/246
2006/0269842 A1 11/2006 Ichinose et al.
2007/0072083 A1 3/2007 Ikuta et al.
2009/0202900 A1 8/2009 Kuroda et al.

FOREIGN PATENT DOCUMENTS

| | | |
|---|---|---|
| JP | 2005-327680 | 11/2005 |
| JP | 2007-12598 | 1/2007 |
| JP | 2008-78008 | 4/2008 |
| KR | 10-2006-0033029 | 4/2006 |
| WO | WO 2005/098997 A1 | 10/2005 |

\* cited by examiner

LITHIUM SECONDARY BATTERY AND USE OF SAME

TECHNICAL FIELD

The present invention relates to a lithium secondary battery, and more particularly, a lithium secondary battery provided with an electrode body in which a porous insulating layer is formed on the surface of an electrode.

Furthermore, this application is a national phase application of International Application No. PCT/JP2009/068997, filed Nov. 6, 2009, and claims the priority of Japanese Patent Application No. 2008-285835, filed on Nov. 6, 2008, the contents of both of which are incorporated herein in their entirety by reference.

BACKGROUND ART

In recent years, lithium secondary batteries, nickel hydrogen batteries and other secondary batteries have become increasingly important as vehicle-mounted power supplies or power supplies of personal computers and portable terminals. Lithium secondary batteries (and typically, lithium ion batteries) in particular are expected to be preferably used as high-output, vehicle-mounted power supplies since they are lightweight and allow the obtaining of high energy density.

In a typical configuration of this type of lithium secondary battery, an electrode is provided that employs a configuration in which a material capable of reversibly occluding and releasing lithium ions (electrode active material) is formed on an electroconductive member (electrode current collector). For example, typical examples of an electrode active material used in a negative electrode (negative electrode active material) include carbon-based materials such as graphite carbon or amorphous carbon. In addition, typical examples of an electrode current collector used in a negative electrode (negative electrode current collector) include sheet-like and foil-like members composed mainly of copper.

In a lithium secondary battery provided with this type of electrode active material, the electrode active material undergoes changes in volume due to expansion and contraction accompanying occlusion and release of lithium ions during charging and discharging. Due to these changes in volume, the electrode active material layer containing the electrode active material may lift from or slide off the electrode current collector causing a decrease in current collection performance of the electrode. In addition, there is the problem of the electrode active material coming off of the electrode current collector not only during charging and discharging, but also during the time from formation of the electrode active material layer to housing within the battery case (such as during the positive electrode, negative electrode and separator lamination steps). In order to deal with such problems, an electrode structure has been proposed in which a porous insulating layer is formed on the electrode active material layer. For example, Patent Document 1 discloses a secondary battery a porous protective film is formed on any of the surfaces of a positive electrode active material coating and negative electrode active material coating. In addition, Patent Documents 2 and 3 describe examples of the prior art relating to this type of porous protective film.

Patent Document 1: Japanese Patent Application Laid-open No. 117-220759
Patent Document 2: Japanese Patent Application Laid-open No. 2005-174792
Patent Document 3: Japanese Patent Application Laid-open No. 2005-327680

However, in the case of installing this type of lithium secondary battery in a vehicle such as an automobile, a battery assembly is constructed by connecting a plurality of the batteries in series in order to obtain high output. At that time, in addition to installation space being limited, since this battery is premised on use in the presence of vibrations, a battery assembly can be constructed in a state in which a large number of single batteries are arranged in a restrained state. Considerable pressure is applied to each battery that composes the battery assembly when restrained in this manner.

DISCLOSURE OF THE INVENTION

The inventor of the present invention discovered a new problem in which, in the case of a battery in which a porous insulating layer is formed on an electrode active material layer as previously described, although initial battery characteristics are obtained when the batteries are restrained during use, battery output decreases greatly during the course of battery use, and therefore attempted to solve such problems. With the foregoing in view, a primary object of the present invention is to provide a battery having superior cycle life that is able to maintain battery output over a long period of time.

The lithium secondary battery provided by the present invention is a battery provided with: an electrode body having a structure in which a positive electrode and a negative electrode are laminated, with a separator interposed therebetween; and a battery case that houses the electrode body together with an electrolyte. A porous insulating layer obtained by filling and molding insulating particles is formed on the surface of at least one of the positive electrode and the negative electrode on the side thereof facing the separator. In addition to using insulating particles having a tap density of 0.4 g/cm$^3$ to 0.9 g/cm$^3$ as the insulating particles that compose the porous insulating layer, the pressure that is applied in the direction of the lamination to the electrode body is set to a range of 4 kgf/cm$^2$ to 50 kgf/cm$^2$ (1 kgf/cm$^2$=approx. 0.098 MPa).

Here, "tap density" refers to the density of a powder as measured in compliance with the method stipulated in JIS-R9301-2-3 (Tamped Density), and is expressed in units of g/cm$^3$.

According to the lithium secondary battery of the present invention, since the pressure (surface pressure) that is applied in the direction of lamination to the electrode body within the battery case is set to the range of 4 kgf/cm$^2$ to 50 kgf/cm$^2$, even in the case the electrode body expands and contracts accompanying charging and discharging, the distance between the positive electrode and the negative electrode can be maintained constant, thereby making it possible to inhibit decreases in battery output. In addition, since insulating particles having a tap density of 0.4 g/cm$^3$ to 0.9 g/cm$^3$ are used for the insulating particles that compose the porous insulating layer, even if the electrode body expands and contracts while the pressure is being applied, compression of the porous insulating layer can be avoided, and decreases in battery output can be inhibited. Namely, according to the present invention, a lithium secondary battery can be provided that is able to inhibit decreases in battery output during the course of use and demonstrate superior cycle life.

In a preferable aspect of the configuration disclosed herein, for the negative electrode a negative electrode active material layer containing a negative electrode active material is formed on a negative electrode current collector made of metal. The porous insulating layer is formed on the surface of the negative electrode on the side facing the separator so as to cover the surface of the negative electrode active material layer. Although there are cases in which the negative electrode active material layer lifts from or peels off the negative electrode body causing a decrease in current collection performance of the negative electrode when the negative electrode active material layer repeatedly expands and contracts as a result of charging and discharging, according to the above-mentioned configuration, since the porous insulating layer covers the negative electrode active material layer, adhesion between the negative electrode active material layer and the negative electrode current collector can be enhanced, thereby making it possible to inhibit separation between the negative electrode active material layer and the negative electrode current collector.

In a preferable aspect of the configuration disclosed herein, the negative electrode current collector is made of copper, and the negative electrode active material is composed of a carbon-based material. Since copper and carbon-based materials demonstrate poor adhesion, separation occurs tends to occur between the negative electrode current collector and the negative electrode active material. Thus, in the case the negative electrode current collector is made of copper and the negative electrode active material is a carbon-based material, the effect of the present invention of inhibiting separation between the negative electrode active material layer and the negative electrode current collector can be demonstrated particularly favorably by covering the negative electrode active material layer with a porous insulating layer.

In a preferable aspect of the configuration disclosed herein, the insulating particles that compose the porous insulating layer are alumina particles. Since alumina particles have superior chemical stability and are highly resistant to electrolyte solution, alumina particles can be preferably used as insulating particles suitable for the object of the present invention.

The present invention also provides a battery assembly for realizing the above-mentioned object. This battery assembly is a battery assembly composed by connecting a plurality of lithium secondary batteries as single batteries in series. The lithium secondary batteries are provided with: an electrode body having a structure in which a positive electrode and a negative electrode are laminated, with a separator interposed therebetween; and a battery case that houses the electrode body together with an electrolyte (and typically, a liquid electrolyte such as a non-aqueous electrolyte solution). In addition, a porous insulating layer obtained by filling and molding insulating particles is formed on the surface of at least one of the positive electrode and the negative electrode on the side thereof facing the separator. Insulating particles having a tap density of 0.4 g/cm$^3$ to 0.9 g/cm$^3$ are used as the insulating particles that compose the porous insulating layer. Each lithium secondary battery that composes the battery assembly is arranged in the direction of the lamination and mutually restrained in the direction of the arrangement. The restraining pressure that is applied to each of the arranged lithium secondary batteries is set to a range of 4 to 50 kgf/cm$^2$.

According to this configuration, as a result of restraining a plurality of lithium secondary batteries arranged in the direction of lamination of an electrode body having a laminated structure in a state in which a load is applied in the direction of their arrangement and due to the restraining pressure applied when restrained, pressure in the direction of lamination suitable for the object of the present invention can be applied to the electrode body within the battery case.

In a preferable aspect of the lithium secondary battery (and battery assembly) disclosed herein, the battery case is a battery case made of aluminum or aluminum alloy (that typically has a thickness of 2 mm or less, and for example, about 0.3 to 1 mm). Since aluminum or aluminum alloy is a material that is comparatively light and is easily distorted by restraining pressure when restrained, restraining pressure applied when restrained can be suitably applied to the electrode body within the battery case.

Since the battery according to the present invention has superior output characteristics after the charge cycle, for example, it is preferable as a battery (and typically, a lithium ion secondary battery) installed in a vehicle such as an automobile. Thus, according to the present invention, for example, a vehicle (such as an automobile) can be provided that is installed with a lithium ion secondary battery (that may also be in the form of a battery assembly in which a plurality of secondary batteries are connected) for use as a motive power source (and typically, a motive power source of a hybrid vehicle or electric vehicle).

BEST MODE FOR CARRYING OUT THE INVENTION

The inventor of the present invention discovered a new problem in which cycle life shortens as a result of battery output decreasing during the course of use when a battery is used in a restrained state in order to maintain a constant distance between the positive electrode and negative electrode of an electrode body in a high-output-type lithium secondary battery, and found that such decreases in battery output can be effectively inhibited by suitably defining the tap density of a porous insulating layer used in the electrode body and the restraining pressure by which the battery is restrained, thereby leading to completion of the present invention.

The following provides an explanation of embodiments according to the present invention while referring to the drawings. In the following drawings, those members and sites demonstrating the same actions are explained using the same reference symbols. Furthermore, dimensional relationships (such as length, width or thickness) in each drawing do not reflect actual dimensional relationships. In addition, unless specifically indicated otherwise in the present description, those matters required for carrying out the present invention (such as methods for producing the positive electrode active material and negative electrode active material, methods for composing and producing the separator and electrolyte, or general technical matters relating to construction of lithium batteries and other general technical matters) can be understood to be design matters for a person with ordinary skill in the art based on prior art in the relevant fields.

Figure 1:
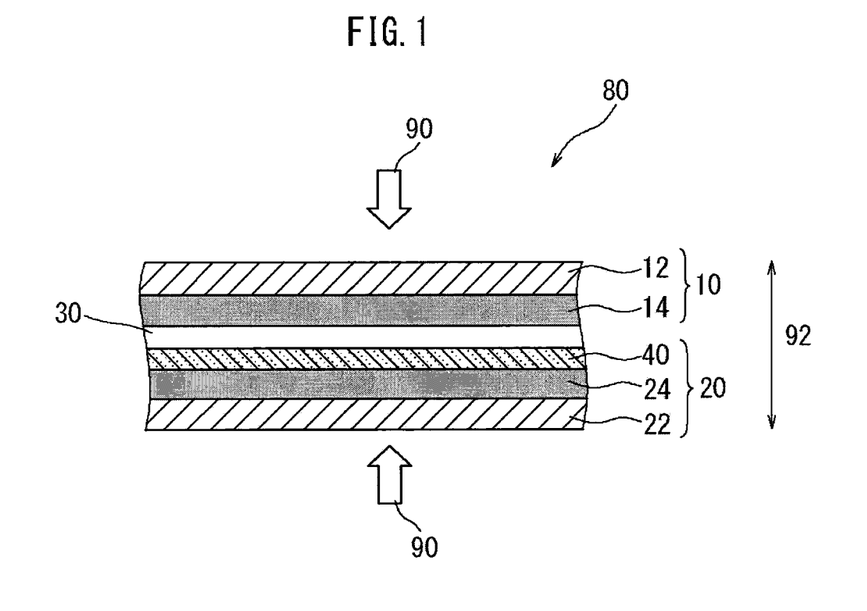
FIG. 1 is a cross-sectional view schematically showing an essential portion of an electrode body according to an embodiment of the present invention.

In a lithium secondary battery (here, a lithium ion battery) according to an embodiment of the present invention, as shown in FIG. 1, an electrode body 80 is provided that has a structure in which a positive electrode 10 and a negative electrode 20 are laminated with a separator 30 interposed there between. The electrode body 80 is composed of prescribed battery composite materials (such as respective active materials of the positive and negative electrodes, respective current collectors of the positive and negative electrodes, and a separator) in the same manner as typical lithium ion batteries. In this embodiment, a positive electrode active material layer 14 containing a positive electrode active material is formed on a positive electrode current collector 12 (here, made of aluminum) in the positive electrode 10. In addition, a negative electrode active material layer 24 containing a negative electrode active material is formed on a negative electrode current collector 22 (here, made of copper) in the negative electrode 20.

In addition, at least one of the electrodes of the positive electrode 10 and the negative electrode 20 has a porous insulating layer 40 in which insulating particles are filled and molded at the interface with the separator 30. In this embodiment, the porous insulating layer 40 is provided on the surface of the negative electrode 20 on the side thereof facing the separator 30 so as to cover the negative electrode active material layer 24. If the negative electrode active material layer 24 is covered with the porous insulating layer 40, adhesion between the negative electrode active material layer 24 and the negative electrode current collector 22 becomes stronger and separation between the negative electrode active material layer 24 and the negative electrode current collector 22 can be inhibited.

The porous insulating layer 40 contains insulating particles and a binder, and together with the insulating particles being immobilized on the surface of the negative electrode active material layer 24 by the binder, the insulating particles are also adhered to each other. A large number of voids are formed at those sites between adjacent insulating particles that are not adhered with binder. Adequate battery output can be obtained as a result of electrolyte solution being retained in these voids (as a result of electrolyte solution permeating into the porous insulating layer 40).

A pressure 90 is applied to the electrode body 80 in a direction of lamination 92 of the electrode body 80. When the electrode body 80 expands and contracts due to charging and discharging, the distance between the positive electrode 10 and the negative electrode 20 increases, and although this causes an increase in battery resistance, by applying the pressure 90 to the electrode body 80 in this manner, the distance between the positive and negative electrodes can be maintained constant and decreases in battery output can be inhibited. The pressure in the direction of lamination applied to the electrode body 80 is, for example, 4 to 50 kgf/cm². As a result, distance between the positive and negative electrodes can be maintained constant even in cases of expansion and contraction of the electrode body 80.

Figure 2:
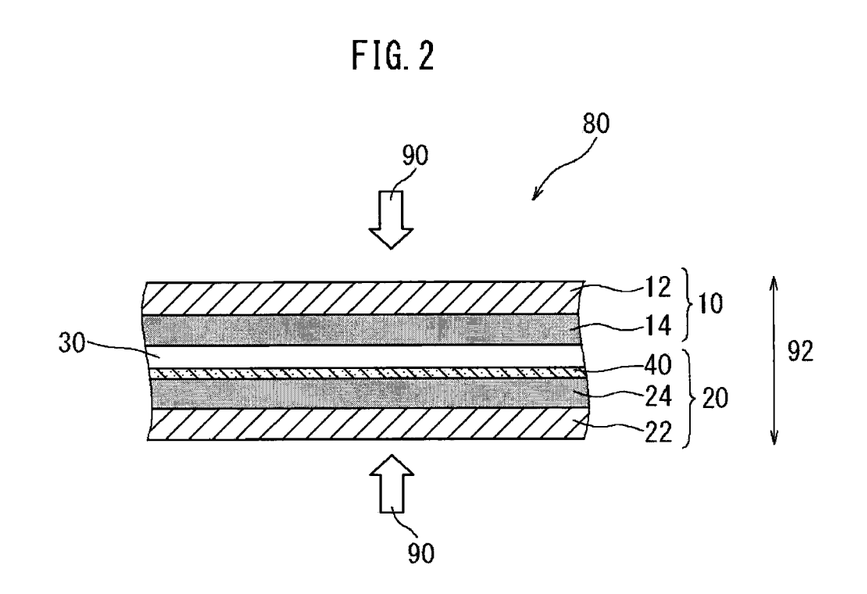
FIG. 2 is a cross-sectional view for explaining a phenomenon in which a porous insulating layer is compressed.

Here, if the tap density of the insulating particles that compose the porous insulating layer 40 is not suitable in a battery in which pressure is applied to the electrode body 80 as described above, battery output may conversely decrease. Namely, if the tap density of the insulating particles is not suitable, as shown in FIG. 2, the porous insulating layer 40 is compressed (for example, rolled out) due to the pressure applied to the electrode body 80 causing the voids between the insulating particles to be crushed. If the voids between the insulating particles are crushed, electrolyte solution is no longer able to be retained in the porous insulating layer 40, thereby causing a considerable decrease in battery output. In the present embodiment, such a decrease in battery output can be effectively inhibited by suitably setting the tap density of the insulating particles that compose the porous insulating layer 40 and the pressure 90 in the direction of lamination 92 applied to the electrode body 80. Namely, the battery according to the present embodiment is characterized by using insulating particles having a tap density of 0.4 to 0.9 g/cm³ for the insulating particles that compose the porous insulating layer 40, and setting the pressure 90 in the direction of lamination 92 applied to the electrode body 80 to a range of 4 to 50 kgf/cm².

Figure 3:
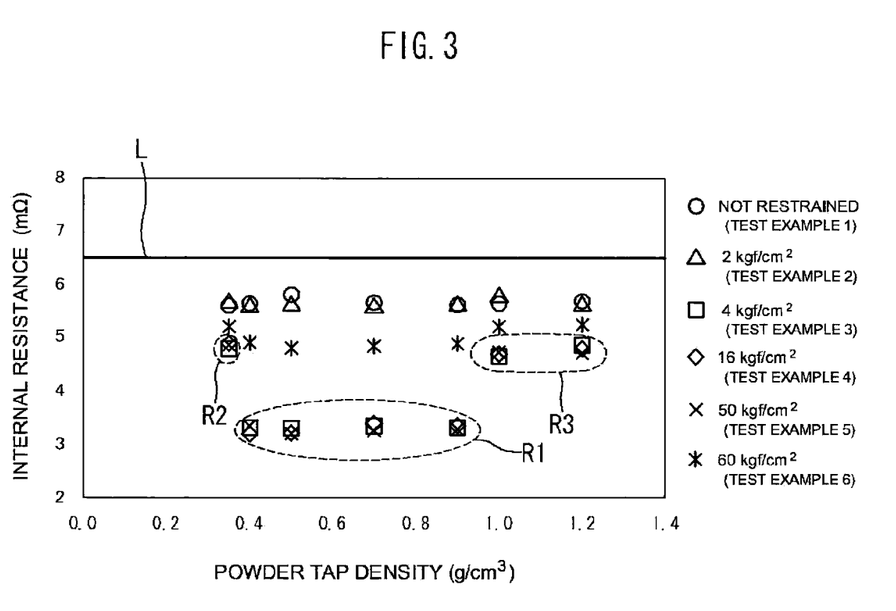
FIG. 3 is a graph indicating the relationship between tap density and battery resistance when changing the pressure applied to an electrode body.

The following provides an explanation of the relationship between tap density of the insulating particles and pressure applied to the electrode body by additionally referring to FIG. 3. FIG. 3 is a graph indicating the relationship between tap density and battery resistance when changing the amount of pressure applied to an electrode body. This graph was obtained from a resistance measurement experiment to be described later. Tap density (g/cm³) is plotted on the horizontal axis and battery resistance (mΩ) is plotted on the vertical axis.

As is clear from FIG. 3, battery resistance decreases when the pressure 90 in the direction of lamination applied to the electrode body 80 is 4 to 50 kgf/cm² (areas represented by broken lines R1, R2 and R3). Namely, when the pressure 90 is less than 4 kgf/cm², the distance between the positive and negative electrodes increases due to expansion and contraction of the electrode body 80 during charging and discharging. Consequently, the internal resistance of the electrode body 80 increases and battery output becomes poor. On the other hand, when the pressure 90 in the direction of lamination applied to the electrode body 80 exceeds 50 kgf/cm², a large load is applied to the porous insulating layer 40, thereby causing the porous insulating layer 40 to be compressed. Consequently, the ability of the porous insulating layer 40 to retain electrolyte solution decreases and battery output becomes poor. Thus, the pressure 90 in the direction of lamination applied to the electrode body 80 is set to the range of 4 to 50 kgf/cm².

In addition, even in the case the pressure 90 in the direction of lamination applied to the electrode body 80 is set to the range of 4 to 50 kgf/cm², battery resistance becomes even lower if insulating particles having a tap density of 0.4 to 0.9 g/cm³ are used for the insulating particles (area represented by broken line R1). Namely, if insulating particles having a tap density in excess of 0.9 g/cm³ are used for the insulating particles, since the insulating particles are finely filled and molded while also being able to flow easily, the porous insulating layer 40 is compressed due to expansion and contraction of the negative electrode active material layer 24. Consequently, the ability of the porous insulating layer 40 to retain electrolyte solution decreases and battery output becomes poor (area represented by broken line R3). On the other hand, if insulating particles having a tap density less than 0.4 g/cm³ are used for the insulating particles, since the insulating particles are coarsely filled and molded and the porous insulating layer 40 becomes thick, the distance between the positive and negative electrodes increases. Consequently, the internal resistance of the electrode body 80 increases and battery output becomes poor. Thus, insulating particles having a tap density of 0.4 to 0.9 g/cm³ are used for the insulating particles that compose the porous insulating layer 40.

According to the lithium secondary battery (lithium ion battery) according to the present embodiment, since the pressure 90 in the direction of lamination applied to the electrode body 80 is set to the range of 4 to 50 kgf/cm², even in the case the electrode body 80 has expanded and contracted accompanying charging and discharging, the distance between the positive electrode 10 and the negative electrode 20 can be maintained constant, thereby making it possible to inhibit decreases in battery output. In addition, since insulating particles having a tap density of 0.4 to 0.9 g/cm³ are used for the insulating particles that compose the porous insulating layer 40, even if the electrode body 80 expands and contracts when subjected to the aforementioned pressure, compression of the porous insulating layer 40 can be avoided, and decreases in battery output can be inhibited. Namely, according to the present invention, a lithium secondary battery (lithium ion battery) can be provided that is able to inhibit decreases in battery output during the course of use and has superior cycle life.

Furthermore, powdered metal oxide, for example, can be used for the material of the insulating particles that compose the porous insulating layer 40. Preferable examples thereof include alumina particles ($Al_2O_3$) and magnesia particles (MgO). Since metal oxide particles have superior chemical stability and are highly resistant to electrolyte solution, they can be preferably used as insulating particles suitable for the object of the present invention. The mean particle diameter of the insulating particles, such as the volume-based mean particle diameter ($D_{50}$) as measured using an ordinary, commercially available particle size meter (for example, a laser diffraction particle size analyzer), is preferably roughly 0.1 to 2 μm and more preferably 0.1 to 1 μm. In addition, although there are no particular limitations thereon, the thickness of the porous insulating layer 40 is preferably roughly 1 to 10 μm, and a porous insulating layer having a thickness of 2 to 7 μm is particularly preferable.

Figure 4:
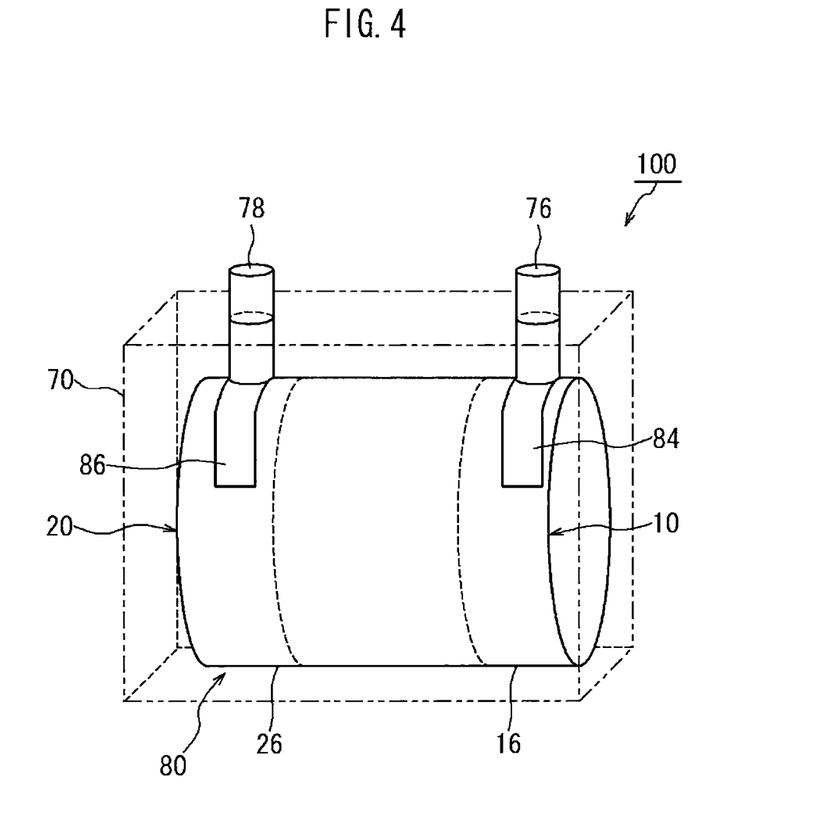
FIG. 4 is a perspective view schematically showing a battery according to an embodiment of the present invention.
Figure 5:
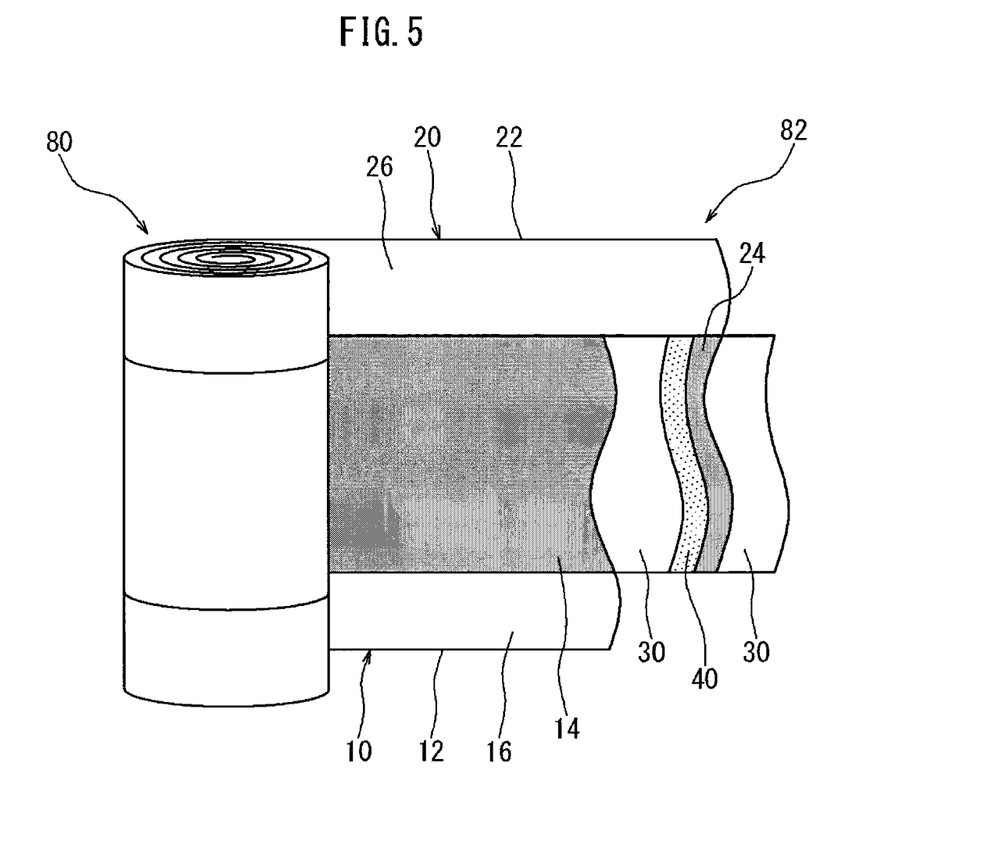
FIG. 5 is a drawing schematically showing an electrode body according to an embodiment of the present invention.
Figure 6:
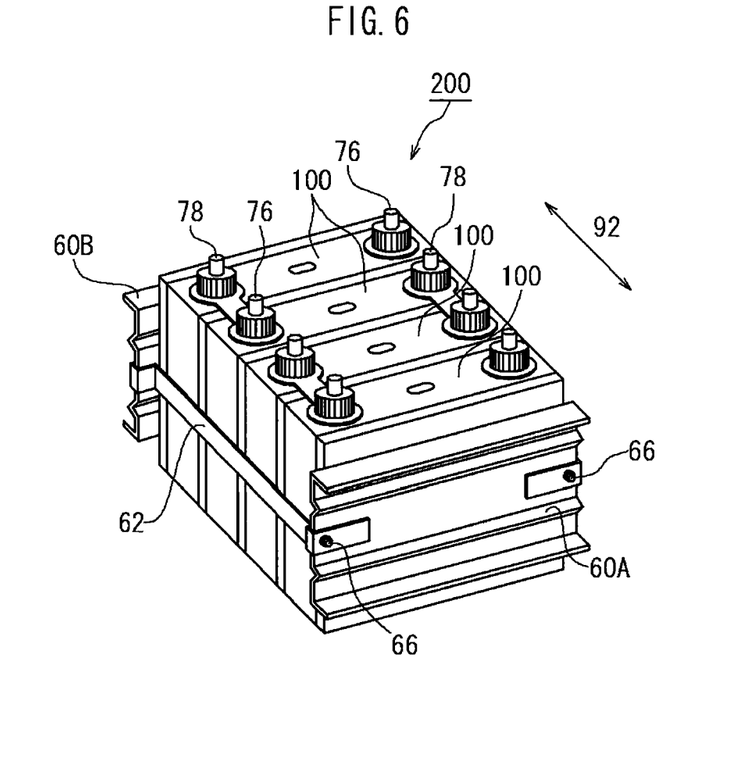
FIG. 6 is a perspective view schematically showing a battery assembly according to an embodiment of the present invention.

Next, an explanation is provided of the overall configuration of a lithium secondary battery (lithium ion battery) 100 according to the present embodiment while referring to the schematic drawings shown in FIGS. 4 to 6. As shown in FIG. 4, the lithium ion battery 100 is provided with the electrode body 80 and a battery case 70 that houses the electrode body 80.

As was previously described, the electrode body 80 is composed of prescribed battery composite materials (such as respective active materials of the positive and negative electrodes, respective current collectors of the positive and negative electrodes, and a separator) in the same manner as electrode bodies provided in typical lithium secondary batteries (lithium ion batteries). Here, a flat, wound-type electrode body 80 is used for the electrode body 80. The battery case 70 has a shape that enables it to house the flat, wound-type electrode body 80 (shape of a box in the example shown in the drawings). In addition, although there are no particular limitations on the material of the battery case and a material may be used that is used in conventional single batteries, a material that is comparatively light and is easily distorted when restrained is a preferable example of a material for carrying out the present invention from the viewpoint of solving the aforementioned problems. For example, an aluminum rectangular case (box-like case) having a size on the long side thereof of 50 mm or more and, for example, 100 to 200 mm, a size on the short side thereof of 5 mm or more and, for example, 10 to 50 mm, a height of 50 mm or more and, for example, about 50 to 200 mm, and a thickness (wall thickness) of 0.2 to 2 mm (typically, 0.3 to 1 mm) over the entire periphery thereof, is a preferable example of the battery case 70. A positive electrode terminal 76 that electrically connects with the positive electrode 10 of the electrode body 80, and a negative electrode terminal 78 that electrically connects with the negative electrode 20 of the electrode body 80, are provided on the upper surface (cover) of the battery case 70.

As shown in FIG. 5, the wound-type electrode body 80 is formed by winding a sheet-like electrode body 82. The sheet-like electrode body 82 has a long (band-like) sheet structure in the preliminary stage of assembling the wound-type electrode body 80. The sheet-like electrode body 82 is formed by laminating a positive electrode sheet 10 and a negative electrode sheet 20 with a total of two separator sheets 30 in the same manner as a typical wound-type electrode body.

The positive electrode sheet 10 is formed by adhering the positive electrode active material layer 14 to both sides of the foil-like positive electrode current collector 12 in the shape of a long sheet. However, the positive electrode active material layer 14 is not adhered to the edge of one side along an end side in the direction of width of the sheet-like electrode body, and the positive electrode current collector 12 is exposed at a constant width. Aluminum foil (as in the present embodiment) or other metal foil suitable for a positive electrode is preferably used for the positive electrode current collector 12. The positive electrode active material layer 14 is composed of a positive electrode active material and another positive electrode active material layer formation component (such as a conductive assistant or binder) as necessary. A positive electrode active material composed mainly of a lithium transition metal complex oxide containing lithium and one or two or more types of transition metal elements as composite metal elements is preferably used for the positive electrode active material. Preferable examples thereof include $LiMn_2O_4$, $LiCoO_2$ and $LiNiO_2$ (as in the present embodiment).

The negative electrode sheet 20 is formed by adhering the negative electrode active material layer 24 to both sides of the foil-like negative electrode current collector 22 in the shape of a long sheet in the same manner as the positive electrode sheet 10. However, the negative electrode active material layer 24 is not adhered to the edge of one side along an end side in the direction of width of the sheet-like electrode body, and the negative electrode current collector 22 is exposed at a constant width. Copper foil (as in the present embodiment) or other metal foil suitable for a negative electrode is preferably used for the negative electrode current collector 22. The negative electrode active material layer 24 is composed of a negative electrode active material and another negative electrode active material layer formation component (such as a conductive assistant or binder) as necessary. One type or two or more types of an active material conventionally used in lithium secondary batteries can be used without any particular limitations for the negative electrode active material. Preferable examples thereof include carbon-based materials such as graphite carbon or amorphous carbon (graphite is used in the present embodiment), lithium-containing transition metal oxides and transition metal nitrides.

In addition, the negative electrode sheet 20 has the porous insulating layer 40 at the interface with the separator 30. Namely, the porous insulating layer 40 is formed on the surface of the negative electrode sheet 20 on the side thereof facing the separator 30 so as to cover the surface of the negative electrode active material layer 24 adhered to both sides of the negative electrode current collector 22. When the negative electrode active material layer 24 repeatedly expands and contracts due to charging and discharging, although there are cases in which the negative electrode active material layer 24 lifts or peels off from the negative electrode current collector 22 causing a decrease in current collection performance of the negative electrode 20, according to the configuration described above, since the porous insulating layer 40 covers the negative electrode active material layer 24, adhesion between the negative electrode active material layer 24 and the negative electrode current collector 22 can be enhanced, thereby making it possible to inhibit separation of the negative electrode active material layer 24 and the negative electrode current collector 22. Since adhesion between copper and carbon-based materials is particularly poor, separation tends to occur between negative electrode current collectors and negative electrode active material layers. Thus, in the case the negative electrode current collector is made of copper and the negative electrode active material layer is composed of a carbon-based material, covering a negative electrode active material layer with a porous insulating layer enables the effect of the present invention of inhibiting separation of the negative electrode active material layer and the negative electrode current collector to be demonstrated particularly favorably.

When constructing the wound-type electrode body 80, a sheet-like electrode body is prepared in which the positive electrode sheet 10 and the negative electrode sheet 20 are laminated with the separator sheet 30 interposed there between. At this time, the separator sheet 30 is superimposed so that a portion 16 of the positive electrode sheet 10 where the positive electrode active material layer is not formed (exposed portion of the positive electrode current collector 12) protrudes to the outside (namely, so that the positive electrode active material layer 14 and the separator 30 are opposed). The negative electrode sheet 20 is laminated in the same manner as the positive electrode sheet 10, and is superimposed so that a portion 26 where the negative electrode active material layer is not formed (exposed portion of the negative electrode current collector 22) protrudes from the separator 30 to the outside (namely, so that the negative electrode active material layer 24 and the porous insulating layer 40 oppose the separator 30). This sheet-like electrode body is then wound after which the resulting wound body is flattened by pressing from a lateral direction to obtain the flat, wound-type electrode body 80.

As shown in FIG. 4, the wound-type electrode body 80 obtained in this manner is housed in the battery case 70 so that the direction of the winding axis is in the horizontal direction (direction to the left and right in the drawing). A positive electrode lead terminal 84 and a negative electrode lead terminal 86 are respectively provided on the portion 16 where the positive electrode active material layer is not formed (exposed portion of the positive electrode current collector 12) and portion 26 where the negative electrode active material layer is not formed (exposed portion of the negative electrode current collector 22), and are respectively electrically connected to the aforementioned positive electrode terminal 76 and the negative electrode terminal 78.

Once the wound-type electrode body 80 has been housed in the battery case 70, a liquid electrolyte (electrolyte solution) is housed in the battery case 70. The electrolyte solution housed in the battery case 70 with the wound-type electrode body 80 is a lithium salt such as $LiPF_6$. For example, an electrolyte solution obtained by dissolving a suitable amount (such as that yielding a concentration of 1 M) of the lithium salt such as $LiPF_6$ in a non-aqueous electrolyte solution in the manner of a mixed solvent of ethylene carbonate and ethyl methyl carbonate (mixed at a volume ratio of 3:7, for example) is used. In addition to housing the wound-type electrode body 80 in the battery case 70, the aforementioned electrolyte solution is injected and sealed inside, thereby enabling the construction of the lithium ion battery 100 of the present embodiment.

Figure 7:
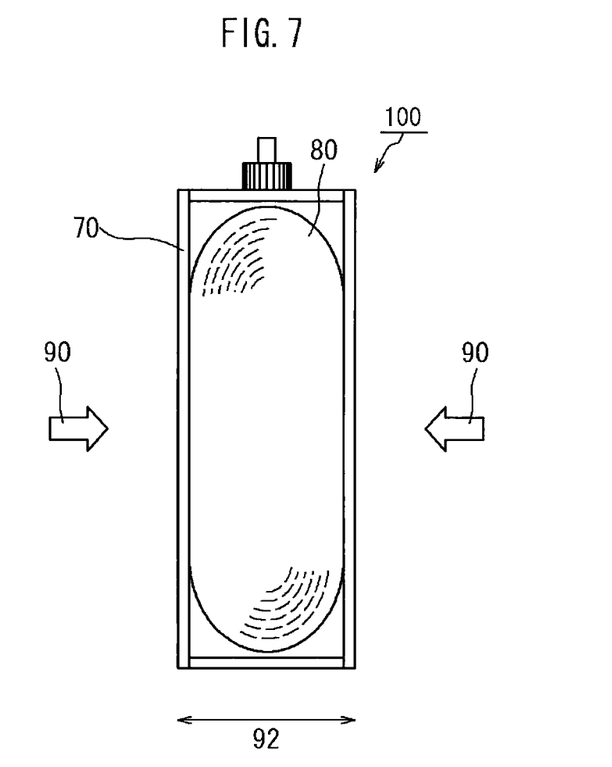
FIG. 7 is a cross-sectional view schematically showing a cross-sectional of a battery that composes a battery assembly according to an embodiment of the present invention; and, FIG. 8 is a side view schematically showing a vehicle according to an embodiment of the present invention.

Next, an explanation is provided of a battery assembly 200 for realizing an object of the present invention while additionally referring to FIGS. 6 and 7. As shown in FIG. 6, this battery assembly 200 is a battery assembly composed by connecting a plurality of the lithium secondary batteries (lithium ion batteries) 100 in series. As shown in FIGS. 1 and 4, these lithium ion batteries 100 are provided with an electrode body 80, which has a structure in which the positive electrode 10 and the negative electrode 20 are laminated with the separator 30 interposed there between, and the battery case 70 that houses the electrode body 80 together with an electrolyte solution. In addition, the porous insulating layer 40, obtained by filling and molding insulating particles, is formed on the surface of the negative electrode 20 on the side facing the separator 30. Insulating particles having a tap density of 0.4 to 0.9 $g/cm^3$ are used for the insulating particles that compose the porous insulating layer 40.

As shown in FIGS. 6 and 7, each lithium secondary battery (here, lithium ion battery) 100 that composes the battery assembly 200 is arranged in the direction of lamination 92 of the electrode body 80 and is mutually restrained in the direction of arrangement. As shown in FIG. 7, a restraining pressure applied to the surface of the battery case 70 (case surface opposing the direction of arrangement) is set to a range of 4 to 50 $kgf/cm^2$.

This setting of restraining pressure can be carried out in the following manner. Namely, as shown in FIG. 6, a plurality of lithium ion batteries 100 are arranged in the direction of lamination 92, and each lithium ion battery 100 is inverted so that each negative electrode terminal 78 and positive electrode terminal 76 is arranged in alternating fashion. In addition, restraining members that collectively restrain a plurality of the batteries 100 are provided on the periphery of the arranged lithium ion batteries 100. Namely, a pair of restraining plates 60A and 60B are arranged further to the outside of the batteries 100 located farthest to the outside in the direction in which the batteries are arranged. In addition, tightening beams 62 are attached so as to bridge the pair of restraining plates 60A and 60B. By fastening and fixing end portions of the beams 62 to the restraining plates 60A and 60B with screws 66, the lithium ion batteries 100 are restrained so that a prescribed load (namely, a pressure (restraining pressure) of 4 to 50 $kgf/cm^2$) applied to the surface of the battery case 70) is applied in the direction of their arrangement. A restraining load (restraining pressure 90) in the direction of tightening (namely, the direction of arrangement) is applied to each battery case 70 in the battery 100 at a level corresponding to the degree of tightening of the beams 62.

As was previously described, since the battery case 70 of the present embodiment is composed of a thin material that is easily distorted from the viewpoint of reducing weight (here, the battery case 70 is made of aluminum), the restraining pressure 90 applied in the direction of arrangement of the lithium ion batteries 100 is transmitted to inner walls of the battery case 70 and the electrode bodies 80 closely arranged therein through the outer walls of the battery case 70 as shown in FIG. 7. Namely, a pressure in the direction of lamination as previously described that is suitable for an object of the present invention can be applied to the electrode bodies 80 within the battery case 70 by the restraining pressure applied in the direction of tightening (namely, the direction of arrangement) at a level corresponding to the degree of tightening of the beams 62.

Furthermore, in the case the battery case 70 is formed from a different material (such as a harder material that is more resistant to distortion than aluminum), or in the case it is formed to a greater wall thickness even if made of aluminum, the degree of tightening of the beams 62 may be suitably adjusted to set a suitable restraining pressure corresponding to the properties of the actual battery case so that a suitable pressure is applied to the electrode bodies 80 housed in the battery case 70 (namely, so that a pressure (surface pressure) is applied to the electrode bodies in the battery case that is equivalent to the pressure applied to the electrode bodies in the battery case when a restraining pressure of 4 to 50 kgf/cm$^2$ has been applied in the case of employing a thin, aluminum battery case as in the present embodiment).

The following provides a more detailed explanation of the battery of the present invention by indicating Test Examples 1 to 6. In these test examples, test lithium secondary batteries were constructed while respectively changing the tap density of the porous insulating layer and the pressure applied to the electrode body, and their battery outputs were evaluated by carrying out battery resistance tests thereon.

<Production of Positive Electrode>

94% by weight of LiNiO$_2$ powder as a positive electrode active material, 1% by weight of carboxymethyl cellulose (CMC) as a thickener, 4% by weight of acetylene black (AB) as an electroconductive agent and 1% by weight of polytetrafluoroethylene (PTFE) as a binder were dispersed in a suitable solvent to prepare a paste. Next, this paste was coated onto a positive electrode current collector (aluminum foil having a thickness of 10 μm) followed by volatilizing the solvent to produce a positive electrode sheet in which a positive electrode active material layer was provided on a positive electrode current collector.

<Production of Negative Electrode>

98% by weight of natural graphite powder as a negative electrode active material, 1% by weight of carboxymethyl cellulose (CMC) as a thickener and 1% by weight of styrene-butadiene rubber (SBR) as a negative electrode binder were dispersed in a suitable solvent to prepare a paste. Next, this paste was coated onto a negative electrode current collector (copper foil having a thickness of 10 μm) followed by volatilizing the solvent to form a negative electrode active material layer on a negative electrode current collector.

In addition, using alumina powder having a tap density of 0.35 g/cm$^3$ as insulating particles, 97% by weight of the alumina powder was dispersed in N-methylpyrrolidone (NMP) as a dispersion solvent together with 3% by weight of PVdF3 as a binder to prepare a paste. The solid concentration in the paste was adjusted to 47% by weight. Next, this paste was coated onto the surface of the negative electrode active material layer followed by volatilizing the NMP to obtain a negative electrode sheet in which a porous insulating layer was provided on the surface of a negative electrode active material layer.

In addition, negative electrode sheets were produced using alumina powders having mutually different tap densities by changing the tap density of the alumina powder. More specifically, alumina powders were used that had tap densities of 0.4 g/cm$^3$, 0.5 g/cm$^3$, 0.7 g/cm$^3$, 0.9 g/cm$^3$, 1.0 g/cm$^3$ and 1.2 g/cm$^3$. Furthermore, tap density was measured in compliance with the method defined in JIS-R9301-2-3.

<Construction of Test Batteries>

Next, the resulting positive electrode sheet and negative electrode sheets were laminated with a fine porous polypropylene separator sheet having a thickness of 25 μm interposed there between, and that laminate was then wound to produce a wound-type electrode body. Next, a positive electrode terminal and a negative electrode terminal were respectively connected to both ends in the axial direction of the wound-type electrode body, and this was housed with an electrolyte solution in a box-like battery case (namely, a rectangular case made of aluminum measuring 110 mm (long side)×15 mm (short side)×90 mm (height), and having a thickness of 0.5 mm over the entire periphery thereof) to produce test lithium ion batteries. An electrolyte solution obtained by dissolving about 1 mol/liter of LiPF$_6$ in a mixed solvent of ethylene carbonate and ethyl methyl carbonate at a ratio (volume ratio) of 3:7 was used for the electrolyte solution. The resulting test batteries were restrained with restraining members, and the restraining pressure generated by the restraining members was set so that a prescribed pressure was applied in the direction of lamination of the electrode bodies housed in the battery case. More specifically, the restraining pressure (pressure applied to the electrode bodies) used to restrain the test batteries was respectively set to no pressure, 2 kgf/cm$^2$, 4 kgf/cm$^2$, 16 kgf/cm$^2$, 50 kgf/cm$^2$ and 60 kgf/cm$^2$ in the order of Test Examples 1 to 6.

<Resistance Test>

Charging and discharging cycles were repeated on the test batteries of Test Examples 1 to 6 produced in the manner described above followed by measuring the battery resistance following the charging and discharging cycles. One cycle of charging and discharging consisted of charging at a measurement temperature of 60° C. to a charging cutoff voltage of 4.1 V at a charging rate of 2C followed by pausing and then discharging to a charging cutoff voltage of 3.0 V at a rate of 2C, and cycling was repeated for 3000 cycles. Battery resistance after 3000 cycles was then measured and evaluated.

The resulting measurement results are shown in FIG. 3 and Table 1. Tap density (g/cm$^3$) is plotted on the horizontal axis in FIG. 3 while battery resistance (mΩ) is plotted on the vertical axis. In addition, each of the plots of O, Δ, □, ◊, × and * in FIG. 3 correspond to results in the absence of pressure applied to the electrode body and pressures of 2 kgf/cm$^2$, 4 kgf/cm$^2$, 16 kgf/cm$^2$, 50 kgf/cm$^2$ and 60 kgf/cm$^2$, respectively. Furthermore, line L represents battery resistance when a porous insulating film has been formed serving as a reference example.

TABLE 1

| Powder tap density | Test Example 1 No restraint | Test Example 2 2 kgf/cm$^2$ | Test Example 3 4 kgf/cm$^2$ | Test Example 4 16 kgf/cm$^2$ | Test Example 5 50 kgf/cm$^2$ | Test Example 6 60 kgf/cm$^2$ |
|---|---|---|---|---|---|---|
| 0.35 g/cm$^3$ | 5.6 | 5.68 | 4.8 | 4.9 | 4.86 | 5.2 |
| 0.4 g/cm$^3$ | 5.64 | 5.62 | 3.3 | 3.2 | 3.34 | 4.9 |
| 0.5 g/cm$^3$ | 5.8 | 5.64 | 3.3 | 3.22 | 3.2 | 4.8 |
| 0.7 g/cm$^3$ | 5.66 | 5.6 | 3.33 | 3.4 | 3.26 | 4.84 |
| 0.9 g/cm$^3$ | 5.62 | 5.64 | 3.3 | 3.36 | 3.28 | 4.88 |
| 1 g/cm$^3$ | 5.64 | 5.8 | 4.65 | 4.7 | 4.74 | 5.2 |
| 1.2 g/cm$^3$ | 5.68 | 5.64 | 4.86 | 4.8 | 4.72 | 5.24 |

As is clear from FIG. 3 and Table 1, in the case of test batteries in which the pressure applied to the electrode body was set to 4 to 50 kgf/cm² (areas represented by broken lines R1, R2 and R3), increases in battery resistance were determined to be inhibited even after 3000 charging and discharging cycles. In particular, in the case of test batteries in which the pressure applied to the electrode body was set to 4 to 50 kgf/cm² and which used alumina powder having a tap density of 0.4 to 0.9 g/cm³ (area represented by broken line R1), increases in battery resistance were determined to be inhibited considerably. On the basis of these findings, it was confirmed that a lithium secondary battery can be provided that has superior cycle life by suitably defining the tap density of the porous insulating layer used in the electrode body and the pressure applied to the electrode body so as to be within the above-mentioned ranges.

Although the preceding descriptions have provided a more detailed explanation of the present invention through preferred embodiments, these descriptions are not intended to be limiting, and various modifications can naturally be made.

For example, although the form of the electrode body according to the present embodiment is of a wound, laminated type in which a single positive electrode sheet 10 and a single negative electrode sheet 20 are wound and laminated with a separator as shown in FIG. 5, the present invention is not limited thereto. For example, the electrode body may be of an alternating laminated type in which a plurality of positive electrodes and a plurality of negative electrodes are alternately wound with a separator. In addition, the pressure applied in the direction of lamination of the electrode body is not limited to a restraining pressure when embodied as a battery assembly as shown in FIGS. 6 and 7. For example, each lithium secondary battery may be individually restrained without embodying a battery assembly. Moreover, an aspect may be employed in which pressure is applied directly to the electrode body in the manner of a pressing spacer instead of using restraining members.

In addition, the configuration of the present invention can be applied to positive and negative electrodes without distinction. For example, the porous insulating layer is not limited to being formed on the negative electrode, but may also be formed on the positive electrode. Namely, the porous insulating layer 40, which is obtained by filling and molding insulating particles, may also be formed on the surface of the positive electrode 10 on the side facing the separator 30. In this case as well, by using insulating particles having a tap density of 0.4 to 0.9 g/cm³ for the insulating particles and setting the pressure in the direction of lamination applied to the electrode body to a range of 4 to 50 kgf/cm², similar results can be obtained and a lithium secondary battery can be provided that has superior cycle life.

Figure 8:
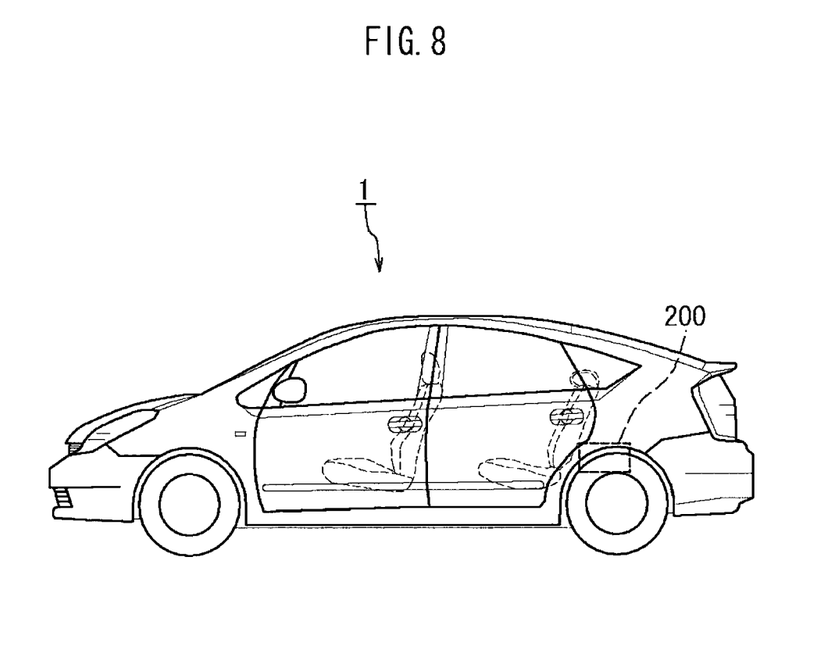

Since a lithium secondary battery provided by the present invention in the manner of the lithium ion battery 100 according to the embodiments described above has superior durability and cycle life as previously described, it can be preferably used as a power supply for a motor (electric motor) installed in a vehicle such as an automobile. Namely, the battery assembly 200 (see FIG. 6) can be constructed by arranging the above-mentioned lithium secondary batteries (lithium ion batteries) 100 as single batteries in a prescribed direction and restraining the single batteries in the direction in which they are arranged as shown in FIG. 7, and a vehicle 1 (typically an automobile, and particularly an automobile provided with an electric motor in the manner of a hybrid vehicle, electric vehicle or fuel cell electric vehicle) can be provided that is provided with the battery assembly 200 as a power source as shown in FIG. 8.

INDUSTRIAL APPLICABILITY

According to the configuration of the present invention, a battery can be provided that is able to maintain battery output over a long period of time and has superior cycle life.

The invention claimed is:

1. A lithium secondary battery comprising:
   a flat wound-type electrode body having a structure in which a positive electrode and a negative electrode are laminated, with a separator interposed therebetween; and
   a battery case that houses the flat wound-type electrode body together with an electrolyte, wherein
   a porous insulating layer obtained by filling and molding insulating particles is formed on a surface of at least one of the positive electrode and the negative electrode on a side thereof facing the separator,
   insulating particles having a tap density of 0.4 g/cm³ to 0.9 g/cm³ are used as the insulating particles that compose the porous insulating layer, and
   the flat wound-type electrode body faces a pressure in a direction of the lamination, wherein the pressure is in a range of 16 kgf/cm² to 50 kgf/cm² and is transmitted to the flat wound-type electrode body through an outer wall of the battery case.

2. The lithium secondary battery according to claim 1, wherein the battery case is made of aluminum or aluminum alloy.

3. The lithium secondary battery according to claim 1, wherein
   for the negative electrode a negative electrode active material layer containing a negative electrode active material is formed on a negative electrode current collector made of metal, and
   the porous insulating layer is formed on a surface of the negative electrode on the side facing the separator so as to cover a surface of the negative electrode active material layer.

4. The lithium secondary battery according to claim 3, wherein the negative electrode current collector is made of copper, and the negative electrode active material is composed of a carbon-based material.

5. The lithium secondary battery according to claim 1, wherein the insulating particles that compose the porous insulating layer are alumina particles.

6. A battery assembly composed by connecting a plurality of lithium secondary batteries in series, wherein
   each of the lithium secondary batteries comprises:
   a flat wound-type electrode body having a structure in which a positive electrode and a negative electrode are laminated, with a separator interposed therebetween; and
   a battery case that houses the flat wound-type electrode body together with an electrolyte,
   a porous insulating layer obtained by filling and molding insulating particles is formed on a surface of at least one of the positive electrode and the negative electrode on a side thereof facing the separator,
   insulating particles having a tap density of 0.4 g/cm³ to 0.9 g/cm³ are used as the insulating particles that compose the porous insulating layer, and
   each lithium secondary battery that composes the battery assembly is arranged in a direction of the lamination and mutually restrained in a direction of the arrangement, and the battery case faces a restraining pressure, wherein the restraining pressure is in a range of 16 kgf/cm² to 50 kgf/cm² and is transmitted to the flat wound-type electrode body through an outer wall of the battery case.

7. The battery assembly according to claim 6, wherein the battery case is made of aluminum or aluminum alloy.

8. A vehicle provided with the lithium secondary battery according to claim 1.

9. A vehicle provided with the battery assembly according to claim 6.

* * * * *